(12) United States Patent
Saito et al.

(10) Patent No.: US 9,319,158 B2
(45) Date of Patent: Apr. 19, 2016

(54) METHOD AND APPARATUS FOR MANAGING CARRIER MEASUREMENTS

(75) Inventors: Mitsuya Saito, Surrey (GB); Keiichi Kubota, Surrey (GB)

(73) Assignee: Nokia Technologies Oy, Espoo (FI)

(*) Notice: Subject to any disclaimer, the term of this patent is extended or adjusted under 35 U.S.C. 154(b) by 244 days.

(21) Appl. No.: 13/379,070

(22) PCT Filed: May 28, 2010

(86) PCT No.: PCT/FI2010/050427
§ 371 (c)(1),
(2), (4) Date: Dec. 19, 2011

(87) PCT Pub. No.: WO2010/146226
PCT Pub. Date: Dec. 23, 2010

(65) Prior Publication Data
US 2012/0099463 A1  Apr. 26, 2012

Related U.S. Application Data (60) Provisional application No. 61/218,658, filed on Jun. 19, 2009.

(51) Int. Cl.
H04W 24/10 (2009.01)
H04W 28/18 (2009.01)
H04B 17/327 (2015.01)

(52) U.S. Cl.
CPC ............ *H04B 17/327* (2015.01); *H04W 24/10* (2013.01); *H04W 28/18* (2013.01)

(58) Field of Classification Search
None
See application file for complete search history.

(56) References Cited

U.S. PATENT DOCUMENTS

| | | | | |
|---|---|---|---|---|
| 6,845,238 B1* | 1/2005 | Muller | ........... | H04W 36/18 370/331 |
| 8,660,559 B2* | 2/2014 | Tamura | ........... | H04W 36/30 455/436 |
| 2006/0141999 A1* | 6/2006 | Funnell et al. | ........... | 455/423 |
| 2009/0005029 A1* | 1/2009 | Wang et al. | ........... | 455/423 |

(Continued)

FOREIGN PATENT DOCUMENTS

WO   WO 2009/022805 A1   2/2009

OTHER PUBLICATIONS

International Search Report and Written Opinion received for corresponding Patent Cooperation Treaty Application No. PCT/FI2010/050427, dated Sep. 16, 2010, 13 pages.

(Continued)

*Primary Examiner* — Ayaz Sheikh
*Assistant Examiner* — Mariela Vidal Carpio
(74) *Attorney, Agent, or Firm* — Alston & Bird LLP (57) ABSTRACT

Various methods for managing carrier measurements are provided. One example method includes capturing a secondary carrier intra-frequency measurement for a secondary carrier frequency and determining that the secondary carrier measurement satisfies secondary carrier event criteria. The secondary carrier event criteria may be derived from an anchor carrier measurement parameter. The example method may also include generating a measurement report in response to the captured secondary carrier intra-frequency measurement satisfying the secondary carrier event criteria. The measurement report message may include an event identifier associated with the satisfied event criteria. Similar and related example methods and example apparatuses are also provided.

12 Claims, 5 Drawing Sheets

(56) References Cited

U.S. PATENT DOCUMENTS

| | | | |
|---|---|---|---|
| 2009/0023436 A1* | 1/2009 | Wu | H04W 24/10 455/419 |
| 2009/0238138 A1* | 9/2009 | Huang et al. | 370/331 |
| 2009/0245178 A1* | 10/2009 | Gholmieh | H04L 1/0001 370/328 |
| 2009/0270103 A1* | 10/2009 | Pani | H04W 36/0083 455/436 |
| 2009/0296643 A1* | 12/2009 | Cave | H04W 52/0216 370/329 |
| 2010/0069065 A1* | 3/2010 | Sambhwani et al. | 455/434 |
| 2010/0113004 A1* | 5/2010 | Cave | H04W 52/365 455/422.1 |
| 2010/0130219 A1* | 5/2010 | Cave | H04W 72/02 455/450 |
| 2010/0222059 A1* | 9/2010 | Pani | H04W 72/0453 455/436 |
| 2010/0238904 A1* | 9/2010 | Zhang et al. | 370/333 |
| 2010/0240358 A1* | 9/2010 | Jen | H04W 36/385 455/424 |
| 2011/0002281 A1* | 1/2011 | Terry | H04W 52/0216 370/329 |
| 2011/0081868 A1* | 4/2011 | Kim et al. | 455/67.11 |
| 2012/0230265 A1* | 9/2012 | Lee | H04L 5/003 370/329 |

OTHER PUBLICATIONS

Huawei, "Discussion on Active Sets and Measurements in DC-HSUPA", 3GPP TSG RAN WG2 Meeting #66, R2-093157, Agenda Item: 10.2, San Francisco, USA, May 4-8, 2009, 4 pages.

Nokia Corporation, "Discussion on Secondary Carrier Intra-Frequency Measurement Procedure", 3GPP TSG RAN WG2 Meeting #67, R2-094367, Agenda Item: 10.2.4, Nokia Siemens Networks, Shenzhen, China, Aug. 24-28, 2009, 2 pages.

Huawei, "Measurement Configuration for DC-HSUPA", 3GPP TSG-RAN WG2 Meeting #67, R2-094539, Agenda Item: 10.2.4, Shenzhen, China, Aug. 24-28, 2009, 5 pages.

"3rd Generation Partnership Project; Technical Specification Group Radio Access Network; Radio Resource Control (RRC); Protocol Specification (Release 8)", 3GPP TS 25.331, v8.6.0, Mar. 2009, pp. 1-1673.

Office Action for Chinese Application No. 201080027233.0 dated Dec. 25, 2013.

Office Action for Chinese Application No. 201080027233.0 dated Sep. 11, 2014.

Notification of Deficiency for corresponding Vietnamese Application No. 1-2011-03535 dated Sep. 25, 2015.

* cited by examiner

METHOD AND APPARATUS FOR MANAGING CARRIER MEASUREMENTS

RELATED APPLICATION

This application is a National Stage Entry of International Application No. PCT/FI2010/050427, filed May 28, 2010, which claims benefit of U.S. Provisional Application No. 61/218,658, filed Jun. 19, 2009.

TECHNICAL FIELD

Embodiments of the present invention relate generally to mechanisms that support wireless communications, and, more particularly, relate to a method and apparatus for managing carrier measurements.

BACKGROUND

The modern communications era has brought about a tremendous expansion of wireless networks. Various types of networking technologies have been developed resulting in an unprecedented expansion of computing networks, telephony networks, and the like, fueled by consumer demand. Wireless and mobile networking technologies have addressed related consumer demands, while providing more flexibility and immediacy of information transfer.

As users become increasingly dependant upon wireless networks for business and personal needs, the desire for faster and more widely accessible wireless communications increases. In some instances, wireless networks may employ various techniques, such as hardware or software solutions, to increase the bandwidth and transfer rates, and the quality of service.

Maintenance of high speed data transfer may be dependent on a number of variables, such signal strength, channel traffic, or the like. Considering the various variables can facilitate the identification of access points, base stations, and cells that can establish a sufficient connection with a mobile terminal to maintain high speed data transfer.

BRIEF SUMMARY

Example methods and example apparatuses are described that facilitate managing carrier measurements. In this regard, according to some example embodiments, a list, referred to as the active set, may be maintained for user equipment (UE), such as a mobile terminal. The active set may be a list of communications cells on a per carrier basis having an Enhanced Dedicated Channel (E-DCH) that meet particular criteria. A secondary E-DCH active set may be a list of secondary carriers and associated cells having an E-DCH that meets particular criteria with respect to a secondary carrier.

To manage an active set, such as a secondary active set, a UE may capture carrier measurements. In example embodiments where a secondary active set is being maintained, a UE may be configured to capture intra-frequency measurements. The intra-frequency measurements associated with a secondary carrier may be captured based on measurement parameters derived from parameters associated with the anchor carrier. Based on the measurement parameters, the results of a measurement may be reported to a network entity by a UE. For example, the intra-frequency measurements may be compared against secondary carrier event criteria to determine if a secondary carrier event has occurred with respect to the secondary carrier. Parameters for configuring the secondary carrier event criteria may be derived or inherited from anchor carrier measurement parameters. Upon identifying a secondary carrier event, a UE may generate a measurement report and, possibly, send the measurement report to a network entity. In some example embodiments, the measurement report may include a measurement or event identifier associated with the event that has occurred. Based on the event identifier, the network entity may make modifications and/or otherwise manage the active set for the UE.

According to various example embodiments, various schemes may be implemented for activating and deactivating the capturing of inter-frequency measurements, the deriving or inheriting of parameters for measurements and event criteria, and the reporting of measurements and events. It is contemplated that the various schemes provided herein, while described separately, may be combined to generate aggregated schemes.

Various example embodiments of the present invention are described herein. One example embodiment is a method for managing carrier measurements. The example method includes providing for capturing a secondary carrier intra-frequency measurement for a secondary carrier frequency, and generating a measurement report for reporting the results of the measurement to a network entity. Parameters for the secondary carrier intra-frequency measurement may be derived from parameters for an anchor frequency. Further, in some example embodiments, the example method may include determining that the secondary carrier measurement satisfies secondary carrier event criteria. The secondary carrier event criteria may be a type of secondary carrier intra-frequency measurement parameters, and as such, the secondary carrier event criteria may be derived from an anchor carrier measurement parameter. The example method also includes generating a measurement report in response to the captured secondary carrier intra-frequency measurement satisfying the secondary carrier event criteria. The measurement report message may include the results of the measurement including an event identifier associated with the satisfied event criteria.

In another example method of the present invention, the example method may include receiving a measurement report. The measurement report may include measurement results including, for example, an event identifier. In some example embodiments, the measurement results may be included in the measurement report in response to the capturing of a measurement or the event criteria for a secondary carrier being satisfied. Parameters for capturing the measurement and/or the secondary carrier event criteria may be derived from anchor carrier measurement parameters. The example method also includes modifying an active set based on the measurement report.

Another example embodiment is an example apparatus for managing carrier measurements. The example apparatus comprises at least one processor and at least one memory including computer program code. The at least one memory and the computer program code may be configured to, with the at least one processor, cause the example apparatus to perform various functionality. For example, the example apparatus may be caused to perform providing for capturing a secondary carrier intra-frequency measurement for a secondary carrier frequency, and generating a measurement report for reporting the results of the measurement to a network entity. Parameters for the secondary carrier intra-frequency measurement may be derived from parameters for an anchor frequency. Further, in some example embodiments, the example apparatus may be further caused to perform determining that the secondary carrier measurement satisfies secondary carrier event criteria. The secondary carrier event criteria may be a type of secondary carrier intra-frequency measurement parameters, and as such, the secondary carrier event criteria may be derived from an anchor carrier measurement parameter. The example apparatus is also caused to perform generating a measurement report in response to the captured secondary carrier intra-frequency measurement satisfying the secondary carrier event criteria. The measurement report message may include the results of the measurement including an event identifier associated with the satisfied event criteria.

Another example embodiment is an example apparatus for managing carrier measurements. The example apparatus comprises at least one processor and at least one memory including computer program code. The at least one memory and the computer program code may be configured to, with the at least one processor, cause the example apparatus to perform various functionality. For example, the example apparatus may be caused to perform receiving a measurement report. The measurement report may include measurement results including, for example, an event identifier. In some example embodiments, the measurement results may be included in the measurement report in response to the capturing of a measurement or the event criteria for a secondary carrier being satisfied. Parameters for capturing the measurement and/or the secondary carrier event criteria may be derived from anchor carrier measurement parameters. The example apparatus is also caused to perform modifying an active set based on the measurement report.

Another example embodiment is an example computer program product for managing carrier measurements. The example computer program product comprises at least one computer-readable storage medium having executable computer-readable program code instructions stored therein. The computer-readable program code instructions of the example computer program product are for providing for capturing a secondary carrier intra-frequency measurement for a secondary carrier frequency, and generating a measurement report for reporting the results of the measurement to a network entity. Parameters for the secondary carrier intra-frequency measurement may be derived from parameters for an anchor frequency. Further, in some example embodiments, the example apparatus may be further caused to perform determining that the secondary carrier measurement satisfies secondary carrier event criteria. The secondary carrier event criteria may be a type of secondary carrier intra-frequency measurement parameters, and as such, the secondary carrier event criteria may be derived from an anchor carrier measurement parameter. The computer-readable program code instructions of the example computer program product are also for generating a measurement report in response to the captured secondary carrier intra-frequency measurement satisfying the secondary carrier event criteria. The measurement report message may include the results of the measurement including an event identifier associated with the satisfied event criteria.

Another example embodiment is an example computer program product for managing carrier measurements. The example computer program product comprises at least one computer-readable storage medium having executable computer-readable program code instructions stored therein. The computer-readable program code instructions of the example computer program product are for receiving a measurement report. The measurement report may include measurement results including, for example, an event identifier. In some example embodiments, the measurement results may be included in the measurement report in response to the capturing of a measurement or the event criteria for a secondary carrier being satisfied. Parameters for capturing the measurement and/or the secondary carrier event criteria may be derived from anchor carrier measurement parameters. The example method also includes modifying an active set based on the measurement report.

Another example embodiment is an apparatus for managing carrier measurements. The example apparatus includes means for providing for capturing a secondary carrier intra-frequency measurement for a secondary carrier frequency, and means for generating a measurement report for reporting the results of the measurement to a network entity. Parameters for the secondary carrier intra-frequency measurement may be derived from parameters for an anchor frequency. Further, in some example embodiments, the example apparatus may be further caused to perform means for determining that the secondary carrier measurement satisfies secondary carrier event criteria. The secondary carrier event criteria may be a type of secondary carrier intra-frequency measurement parameters, and as such, the secondary carrier event criteria may be derived from an anchor carrier measurement parameter. The example apparatus also includes means for generating a measurement report in response to the captured secondary carrier intra-frequency measurement satisfying the secondary carrier event criteria. The measurement report message may include the results of the measurement including an event identifier associated with the satisfied event criteria.

Another example embodiment is an apparatus for managing carrier measurements. The example apparatus includes means for receiving a measurement report. The measurement report may include measurement results including, for example, an event identifier. In some example embodiments, the measurement results may be included in the measurement report in response to the capturing of a measurement or the event criteria for a secondary carrier being satisfied. Parameters for capturing the measurement and/or the secondary carrier event criteria may be derived from anchor carrier measurement parameters. The example apparatus also includes means for modifying an active set based on the measurement report.

BRIEF DESCRIPTION OF THE DRAWING(S)

Having thus described the invention in general terms, reference will now be made to the accompanying drawings, which are not necessarily drawn to scale, and wherein:

DETAILED DESCRIPTION

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments of the present invention, to refer to data capable of being transmitted, received, operated on, and/or stored.

As used herein, the term 'circuitry' refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

An Enhanced Uplink Dedicated Channel (E-DCH) feature, also referred to as High Speed Uplink Packet Access (HSUPA) has been introduced by the $3^{rd}$ Generation Partnership Project (3GPP). HSUPA has been developed to facilitate an increase in uplink data transfer speeds. To do so, HSUPA facilitates the generation of an E-DCH active set, which is a list of the communications cells (e.g., Node B's (NBs)) that carry a satisfactory E-DCH for a given UE. HSUPA is evolving into what has been coined Dual Cell or Dual Carrier HSUPA (DC-HSUPA), which may involve an analysis of multiple carriers to determine how to modify or otherwise manage an E-DCH active set. The multiple carriers to be analyzed may include an anchor carrier and secondary carriers, each of which may have a separate E-DCH active set. The anchor carrier frequency is different from the secondary carrier frequencies. A secondary carrier's active set may be referred to as a secondary E-DCH active set.

In accordance with a DC-HSUPA scheme, a UE may facilitate the maintenance of an E-DCH active set associated with the respective UE on a per carrier basis. To do so, a UE may capture measurements of the signals on the carrier frequencies. The UE may capture intra-frequency measurements, allowing for measurements on a per cell basis. Based on the measurements, decisions may be made as whether a cell associated with the measured signal should be included in an active set for the UE. In this regard, a cell may be added to or removed from the active set. Intra-frequency measurements may be utilized for both anchor carrier and secondary carrier analyses. However, measurement parameters and event criteria (as further described below) for secondary carrier analysis may need to be defined.

An intra-frequency measurement may be a measurement on one or more downlink physical channels at the same frequency as the frequency identified in an active set. Intra-frequency measurements may be used to add or remove a cell to/from the active set. On the other hand, inter-frequency measurement is a measurement on downlink physical channels at frequencies that differ from the frequency of the active set and on downlink physical channels in the active set. Inter-frequency measurement is used to measure the quality of the frequencies, which might not be used within the active set to allow the network can trigger a change in the frequency of the active set based on the inter-frequency measurement results.

Figure 1:
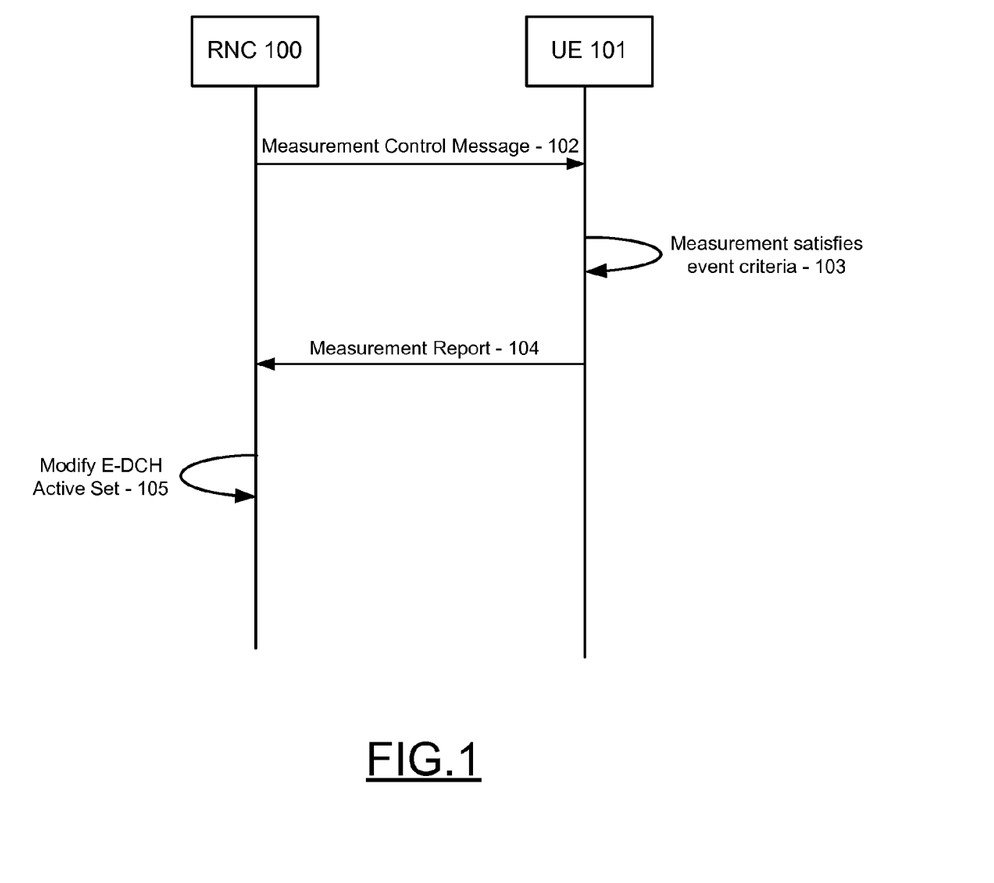
FIG. 1 illustrates a system and signaling diagram for managing carrier measurements according to various example embodiments of the present invention.

FIG. 1 illustrates an example system and signaling diagram for managing secondary carrier intra-frequency measurements to facilitate maintenance of a secondary E-DCH active set. The example system of FIG. 1 includes a Radio Network Controller (RNC) 100 and a UE 101. The RNC 100 may be configured to maintain at least one secondary active set for an associated secondary carrier to be used by the UE 101. FIG. 1 illustrates a simplified illustration of a system that would support communications between the UE 101 and the RNC 100, and one of skill in the art would appreciate that other network entities (e.g., access points, base stations, etc.) may be located between the UE 101 and the RNC 100 that support communications between the UE 101 and the RNC 100.

At 102, RNC 100 transmits an activation indication in the form of a measurement control message to the UE 101. According to some example embodiments, the RNC 100 may alternatively provide a system information broadcast to provide an activation indication. The measurement control message, or the system information broadcast, may include measurement parameters.

Measurement parameters, whether for a secondary carrier or an anchor carrier, may include, for example, a measurement identity, a measurement command, and a measurement type. A measurement identity may be a reference number used identifying a measurement when setting up, modifying, or releasing a measurement. The measurement identity may also be used for measurement reporting. The measurement command may indicate the action to be taken by the UE with respect to the measurement identity. The measurement command may indicate that the UE should setup a new measurement, modify an existing measurement, or release (e.g., discontinue) an existing measurement.

The measurement type parameters may indicate further criteria for the measurement. A number of measurement type parameters may be utilized. For example, measurement objects may be provided as a parameter to indicate the objects upon which the UE should make measurements. A measurement quantity parameter may indicate the quantity that the UE should measure with respect to the object, for example, for use in filtering. Further, a reporting quantity parameter may indicate a quantity that a UE should include in a reporting message, possibly in addition to other default quantities that the UE may include in a reporting message. A measurement validity parameter may indicate the states in which the measurement is valid. A measurement reporting mode parameter may specify how the UE should transmit a measurement report (e.g., via acknowledgement mode (AM) or unacknowledged mode radio link control (UM RLC)). Additional measurement identities parameters may also be provided that identify additional measurements to be reported. The measurement parameters may include various parameters as described in 3GPP TS 25.331, "Radio Resource Control (RRC); Protocol Specification," which is hereby incorporated by reference in its entirety.

In response, the UE 101 may begin capturing measurements with respect to a secondary carrier. The captured measurements may be intra-frequency measurements of signals from a particular cell. In this regard, secondary carrier intra-frequency measurements may refer to measurements used for maintenance of an associated secondary E-DCH active set.

According to various example embodiments, the measurements captured by the UE 101 may be captured based on parameters derived from anchor carrier parameters. In this regard, the UE 101 may have received anchor carrier measurement parameters from a network entity or otherwise obtained anchor carrier measurement parameters. For example, the UE 101 may have received anchor carrier measurement parameters via the measurement control message 102. According to some example embodiments, upon capturing a measurement, the UE 101 may provide a measurement report to a network entity, such as the RNC 100 at 104.

According to some example embodiments, the derived secondary carrier measurement parameters may be used as event criteria to identify events on the secondary carriers. In this regard, the secondary carrier measurements, captured using measurement parameters derived from anchor carrier measurement parameters, may be compared to event criteria to determine whether an event has occurred. Any number of event types may be defined and considered during the analysis of the captured measurements. For example, a first event, having an event identifier of "1a," may occur when the signal quality of a cell exceeds a given threshold as indicated by a measurement of the signal. Similarly, a second event, for example having an event identifier of "1b," may occur when the signal quality falls below a given threshold (e.g., the UE 101 has moved away from the cell). In this regard, the event criteria for a given event may be unique for that event, and, as such, different events may consider different criteria (e.g., different thresholds).

The secondary carrier measurement parameters, including the criteria associated with an event, (e.g., thresholds and the like) may be derived in a number of ways. For example, the secondary carrier measurement parameters used for a secondary carrier analysis may be derived from parameters used for an anchor carrier analysis. According to some example embodiments, the secondary carrier measurement parameters may be inherited from anchor carrier measurement parameters. In this regard, in accordance with various example embodiments, the measurement control message at 102 may provide anchor carrier measurement parameters for use with anchor carrier measurements, and the UE 101 may derive or inherit secondary carrier measurements from the anchor carrier measurement parameters without additional signaling from the RNC 100.

In example scenarios where the measurement parameters are configured to identify and report the occurrence of an event, the intra-frequency measurements for a secondary carrier may be compared to the event criteria to determine whether a respective event has occurred. Referring again to FIG. 1, at 103 the measurements satisfy the event criteria for a given event. In response to the UE 101 identifying that an event has occurred, the UE 101 may generate a measurement report. As stated above, a measurement report may also be generated in response to capturing of a measurement, depending on the measurement parameters. The measurement report may include various information, such as the measurement identifier, an identifier of the event that has occurred (e.g., 1a, 1b, etc.), an indication of the associated secondary carrier, an indication of the cell or object that is involved in the event, and/or the like.

The UE 101 may provide the measurement report to the RNC 100 at 104. The measurement report may be a Radio Resource Control (RRC) MeasurementReport message. In response to receipt of the measurement report, the RNC 100 may be configured to modify the associated secondary active set for the UE 101 at 105. The UE 101 may subsequently utilize the modified secondary active set when transitioning between cells or for other actions that may be performed that involve use of the secondary active set.

Not depicted in FIG. 1, the UE 101 may also receive an indication that measurement capturing may be discontinued or the UE 101 may otherwise determine that measurement capturing may be discontinued. In response, the UE 101 may suspend further measurement capturing with respect to one or more carriers and await an indication to again activate measurement capturing.

The above description, with respect to FIG. 1, provides a general explanation of the interactions and functionality performed with respect to maintenance of a secondary active set, the derivation of secondary carrier measurement parameters from anchor carrier measurement parameters, and the operations associated therewith. The following provides a description of more specific schemes and techniques that may be employed in accordance with example embodiments of the present invention to facilitate maintenance of a secondary active set, derivation of secondary carrier measurement parameters from anchor carrier measurement parameters, and the operations associated therewith.

Prior to determining whether an event has occurred, secondary carrier intra-frequency measurement may be activated. As depicted in FIG. 1, a measurement control message from the RNC 100 to the UE 101 provides an indication to the UE 101 to activate the capture of secondary carrier intra-frequency measurements. However, in accordance with various example embodiments, other activation indicators, and combinations of indicators, may be utilized and or received by the UE 101 to trigger activation of secondary carrier intra-frequency measurements. In this regard, according to some example embodiments, an activation indicator received by the UE 101 may be an indication that a network entity (e.g., RNC 100) has enabled a DC-HSUPA operation for a secondary carrier frequency (e.g. via an RRC reconfiguration message). Alternatively or additionally, according to some example embodiments, an activation indicator received by the UE 101 may be an indication that a network entity (e.g., RNC 100) has enabled a Dual Cell—High Speed Downlink Access (DC-HSDPA) operation for a secondary carrier frequency (e.g. via an RRC reconfiguration message).

Additionally, or alternately, according to some example embodiments, an activation indicator received by the UE 101 may be an indication that a network entity (e.g., RNC 100) has configured an inter-frequency measurement for the frequency used for DC-HSUPA operation. In this regard, an indication that event triggered inter-frequency measurements may have been activated and commenced, may be a prompt to activate and commence capture of secondary carrier intra-frequency measurements for the same or other secondary carriers. Additionally, or alternately, according to some example embodiments, an activation indicator received by the UE 101 may be an indication that a network entity has configured an inter-frequency measurement for the frequency used for DC-HSDPA operation. In this regard, an indication that event triggered inter-frequency measurements has been activated and commenced may be a trigger for activating and commencing capture of secondary carrier intra-frequency measurements for the same or other secondary carriers.

Similar to activation of the capturing of secondary carrier intra-frequency measurements, triggers for deactivation, to discontinue the capturing of secondary carrier intra-frequency measurements, may also be defined. In this regard, a deactivation indicator triggering the UE 101 to discontinue the capturing of secondary carrier intra-frequency measurements may include an indication that a network entity (e.g., RNC 100) has discontinued a DC-HSUPA operation for a secondary carrier frequency. Additionally, or alternately, according to some example embodiments, a deactivation indicator triggering the UE 101 to discontinue the capturing of secondary carrier intra-frequency measurements may include an indication that a network entity (e.g., RNC 100) has discontinued a DC-HSDPA operation for a secondary carrier frequency.

Additionally, or alternately, according to some example embodiments, the UE 101 may discontinue the capturing of secondary carrier intra-frequency measurements in response to receiving an indication that a network entity (e.g., RNC 100) has discontinued inter-frequency measurements for a secondary carrier frequency. Additionally, or alternately, according to some example embodiments, the UE 101 may discontinue secondary carrier intra-frequency measurements in response to reporting criteria for inter-frequency measurements being satisfied. In this regard, reporting criteria for an inter-frequency measurement event may be satisfied when an inter-frequency measurement, for example, exceeds a given threshold. The capturing of inter-frequency measurement may have been configured to discontinue upon the occurrence of a particular event and the reporting of the event. Accordingly, when the capturing of inter-frequency measurements is configured to discontinue, the capturing of secondary carrier intra-frequency measurements may also be discontinued.

Again referring to the description of FIG. 1, the event criteria for the secondary carrier events may be derived or inherited from the parameters used for anchor carrier measurement capture. Further, according to some example embodiments, non-event related parameters may also be derived or inherited from measurement parameters for the anchor carrier. A network entity (e.g., the RNC 100) may provide parameters to be used for the identification of events on the anchor carrier. These same parameters, or derivations from the parameters, may be used for the identification of events on a secondary carrier. In this regard, measurement parameters and events associated with the anchor carrier may be correlated to the same parameters and events on the secondary carrier. For example, a measurement parameter for a strong signal event on the anchor carrier may indicate a given threshold for determining that a strong signal has been identified. The same threshold may be used to determine whether a strong signal event has occurred on a secondary carrier.

As such, according to some example embodiments, secondary carrier event criteria may be derived from some or all of the intra-frequency measurement parameters for the anchor carrier. Additionally, or alternately, according to some example embodiments, secondary carrier event criteria for one or more secondary carrier specific events may be derived from the intra-frequency measurement parameters for the same events associated with the anchor carrier. In this regard, if there are more than one anchor carrier event of a common type, the measurement parameters associated with the lowest measurement identity may be used to derive the secondary carrier event criteria. In this regard, for example, if event 1*a* intra-frequency measurements for the anchor carrier are configured with measurement identity 1 and 3, then measurement identity 1's measurement parameters may be used to configure the event 1*a* intra-frequency measurement for the secondary carrier. Additionally, or alternately, according to some example embodiments, secondary event criteria for one or more specific secondary carrier events may be derived from the inter-frequency measurement parameters for the events associated with the anchor carrier.

Additionally, or alternately, according to some example embodiments, a network entity (e.g., the RNC 100) may indicate in a message (e.g., a MeasurementControl message) or other communication (e.g., other RRC message such as a PhysicalChannelReconfiguration message), which anchor carrier measurement parameters may be used, and/or which anchor carrier measurement parameters are not to be used, to derive secondary carrier measurement parameters and secondary carrier event criteria. For example, the RNC 100 may indicate the anchor carrier measurement identities that may be used to derive secondary carrier event criteria, and which secondary carrier measurements and/or event identities may be configured. Additionally, or alternately, according to some example embodiments, secondary carrier measurement parameters and/or secondary carrier event criteria may be derived from other configuration parameters, such as measurement reporting criteria parameters, reporting deactivation threshold parameters, replacement activation threshold parameters, amount or quantity of reporting parameters, reporting interval parameters, and the like.

Again referring to the description of FIG. 1, the manner in which the measurement report is formatted and provided may also be defined as indicated at 104. In this regard, the measurement report message may indicate a measurement identity defined for the anchor carrier's intra-frequency measurement or an event identity. In this regard, the secondary carrier's measurement identity may be derived or inherited from the anchor carrier's measurement identity. Further, the measurement report may also include frequency information for the secondary carrier.

Additionally, or alternately, according to some example embodiments, the measurement report message may indicate the measurement identity for the secondary carrier's inter-frequency measurements. In this regard, if more than one inter-frequency measurement or event is associated with a secondary carrier intra-frequency measurement, then one of the inter-frequency measurements may be selected and the corresponding measurement identity may be included. For example, the lowest measurement identity among the configured inter-frequency measurements may be used.

Additionally, or alternately, according to some example embodiments, the measurement report message may indicate a measurement identity dedicated for the secondary carrier intra-frequency measurement reporting. The measurement identity may be provided by a network entity (e.g., the RNC 100) in, for example, a measurement control message or other RRC messages (e.g. a PhysicalChannelReconfiguration message). The measurement identity may be provided when an inter-frequency measurement may be configured for the secondary carrier.

Figure 2:
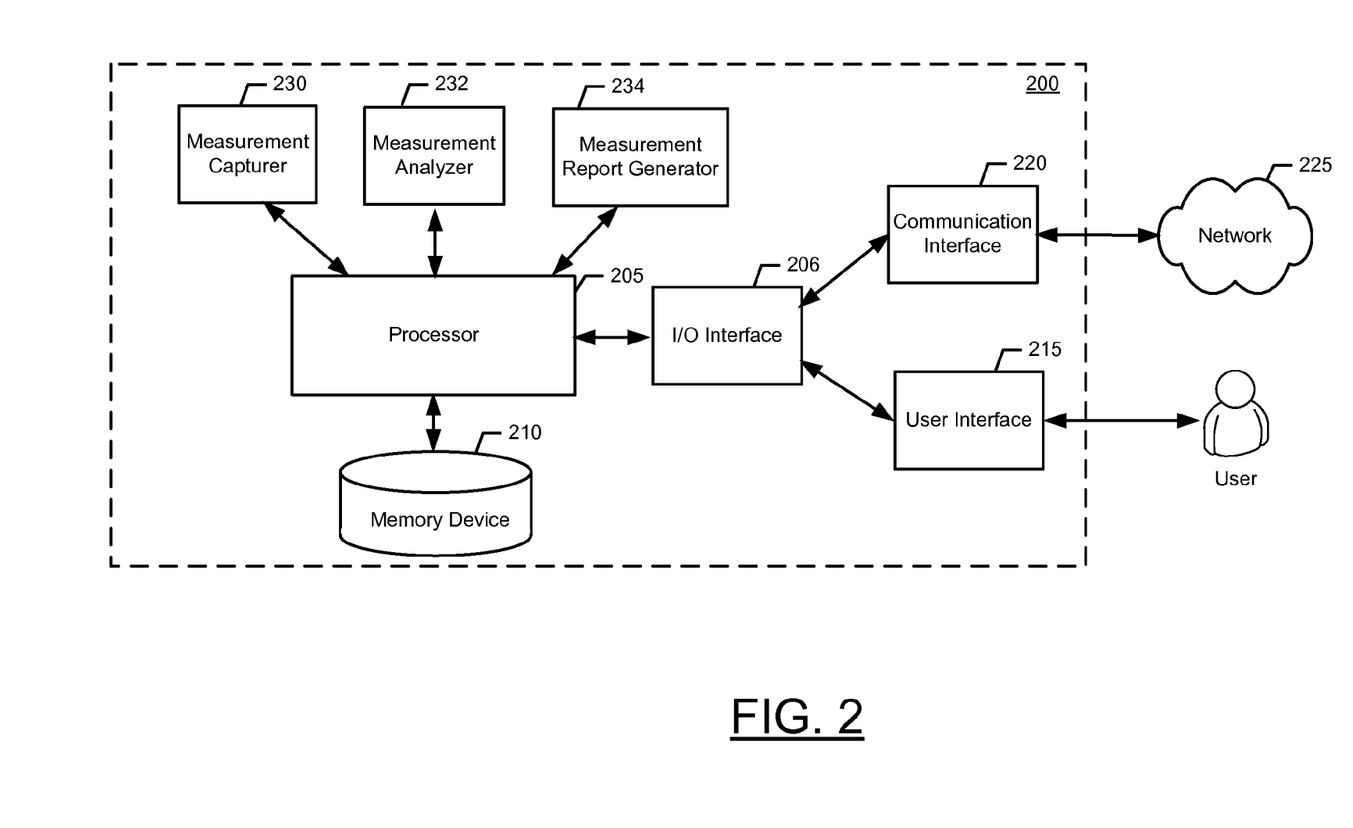
FIG. 2 illustrates an apparatus for managing carrier measurements according to various example embodiments of the present invention.
Figure 3:
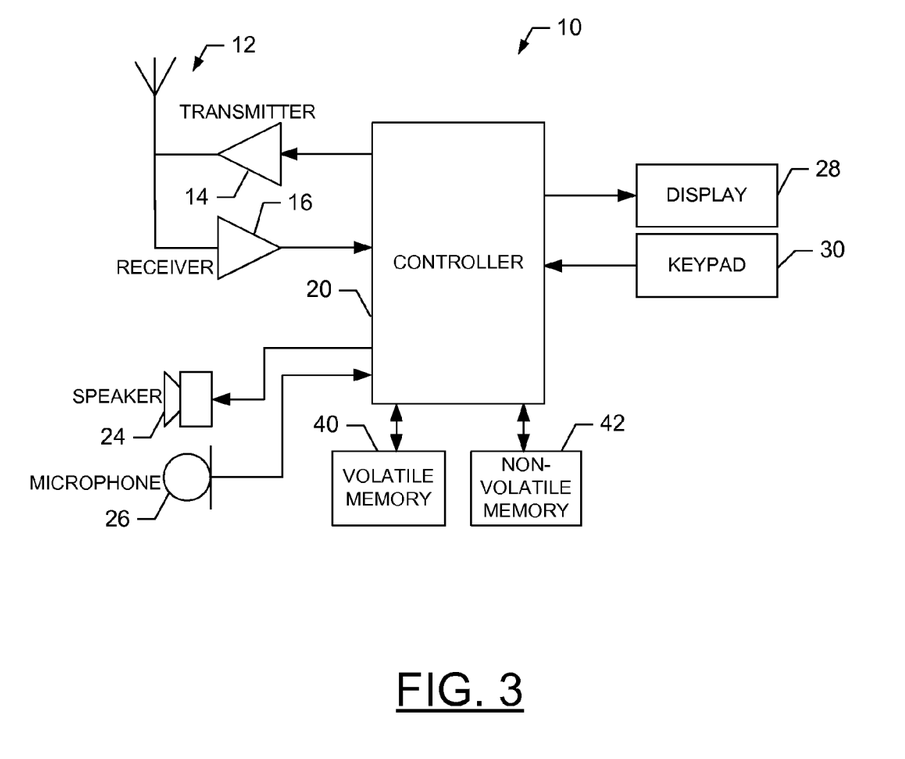
FIG. 3 illustrates an apparatus in the form of a mobile terminal for managing carrier measurements according to various example embodiments of the present invention.
Figure 4:
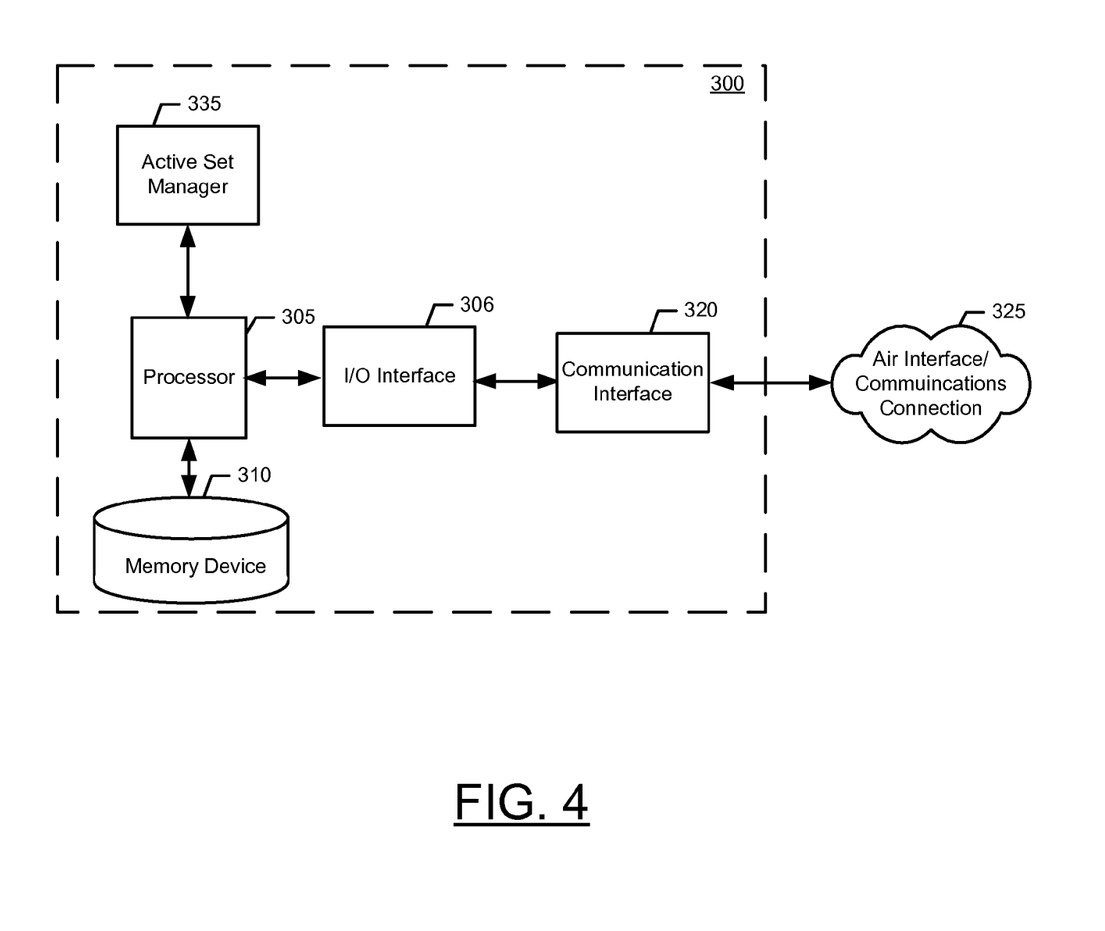
FIG. 4 illustrates another apparatus for managing carrier measurements according to various example embodiments of the present invention.

The forgoing describes a plurality of mechanisms by which secondary carrier measurements may be activated, deactivated, defined, and reported. Alternatives and combinations of these mechanisms have been described such that one of skill in the art would appreciate that the various mechanisms may be combined in a number of manners. Further, the description provided above and generally herein illustrates example methods, example apparatuses, and example computer program products for managing carrier measurements. FIGS. 2-4 illustrate example apparatus embodiments of the present invention configured to perform the various functionalities described herein. FIGS. 2 and 3 depict example apparatuses that are configured to perform various functionalities from the perspective of the UE 101 depicted in FIG. 1 and as generally described herein. FIG. 4 depicts an example apparatus that is configured to perform various functionalities from the perspective of a network entity, such as the RNC 100 depicted in FIG. 1 and as generally described herein. The example apparatuses depicted in FIGS. 2-4 may also be configured to perform example methods of the present invention, such as those described with respect to FIGS. 1, 5 and/or 6.

Referring now to FIG. 2, in some example embodiments, the apparatus 200 may, be embodied as, or included as a component of, a communications device with wired or wireless communications capabilities. In some example embodiments, the apparatus 200 may include or be included within a communications device, such as a stationary or mobile access point or a mobile terminal such as a mobile telephone, a portable digital assistant (PDA), a pager, a mobile television, a gaming device, a mobile computer, a laptop computer, a camera, a video recorder, an audio/video player, a radio, and/or a global positioning system (GPS) device, any combination of the aforementioned, or the like. Regardless of the type of communications device, apparatus 200 may also include computing capabilities.

The example apparatus 200 includes or is otherwise in communication with a processor 205, a memory device 210, an Input/Output (I/O) interface, a communications interface 220, user interface 215, a measurement capturer 230, a measurement analyzer 232, and a measurement report generator 234. The processor 205 may be embodied as a means for implementing various functionality of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, processor 205 may be representative of a plurality of processors, or one or more multiple core processors, operating in concert. Further, the processor 205 may be comprised of a plurality of transistors, logic gates, a clock (e.g., oscillator), and the like to facilitate performance of the functionality described herein. The processor 205 may, but need not, include one or more accompanying digital signal processors. In some example embodiments, the processor 205 is configured to execute instructions stored in the memory device 210 or instructions otherwise accessible to the processor 205. The processor 205 may be configured to operate such that the processor causes the apparatus 200 to perform various functionalities described herein.

Whether configured as hardware or via instructions stored on a computer-readable storage medium, or by a combination thereof, the processor 205 may be an entity capable of performing operations according to embodiments of the present invention while configured accordingly. Thus, in example embodiments where the processor 205 is embodied as an ASIC, FPGA, or the like, the processor 205 is specifically configured hardware for conducting the operations described herein. Alternatively, in example embodiments where the processor 205 is embodied as an executor of instructions stored on a computer-readable storage medium, the instructions specifically configure the processor 205 to perform the algorithms and operations described herein. In some example embodiments, the processor 205 is a processor of a specific device (e.g., a mobile terminal) configured for employing example embodiments of the present invention by further configuration of the processor 205 via executed instructions for performing the algorithms and operations described herein.

The memory device 210 may be one or more computer-readable storage media that may include volatile and/or non-volatile memory. In some example embodiments, the memory device 210 includes Random Access Memory (RAM) including dynamic and/or static RAM, on-chip or off-chip cache memory, and/or the like. Further, memory device 210 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 210 may include a cache area for temporary storage of data. In this regard, some or all of memory device 210 may be included within the processor 205.

Further, the memory device 210 may be configured to store information, data, applications, computer-readable program code instructions, or the like for enabling the processor 205 and the example apparatus 200 to carry out various functions in accordance with example embodiments of the present invention described herein. For example, the memory device 210 could be configured to buffer input data for processing by the processor 205. Additionally, or alternatively, the memory device 210 may be configured to store instructions for execution by the processor 205.

The I/O interface 206 may be any device, circuitry, or means embodied in hardware, computer program porduct, or a combination of hardware and software that is configured to interface the processor 205 with other circuitry or devices, such as the communications interface 220 and the user interface 215. In some example embodiments, the processor 205 may interface with the memory 210 via the I/O interface 206. The I/O interface 206 may be configured to convert signals and data into a form that may be interpreted by the processor 205. The I/O interface 206 may also perform buffering of inputs and outputs to support the operation of the processor 205. According to some example embodiments, the processor 205 and the I/O interface 206 may be combined onto a single chip or integrated circuit configured to perform, or cause the apparatus 200 to perform, various functionalities of the present invention.

The communication interface 215 may be any device or means embodied in either hardware, a computer program product, or a combination of hardware and a computer program product that is configured to receive and/or transmit data from/to a network and/or any other device or module in communication with the example apparatus 200. Processor 205 may also be configured to facilitate communications via the communications interface by, for example, controlling hardware included within the communications interface 215. In this regard, the communication interface 215 may include, for example, one or more antennas, a transmitter, a receiver, a transceiver and/or supporting hardware, including a processor for enabling communications with network 220. Via the communication interface 215 and the network 220, the example apparatus 200 may communicate with various other network entities in a device-to-device fashion and/or via indirect communications via a base station, access point, server, gateway, router, or the like.

The communications interface 215 may be configured to provide for communications in accordance with any wired or wireless communication standard. The communications interface 215 may be configured to support communications in multiple antenna environments, such as multiple input multiple output (MIMO) environments. Further, the communications interface 215 may be configured to support orthogonal frequency division multiplexed (OFDM) signaling. In some example embodiments, the communications interface 215 may be configured to communicate in accordance with various techniques, such as, second-generation (2G) wireless communication protocols IS-136 (time division multiple access (TDMA)), GSM (global system for mobile communication), IS-95 (code division multiple access (CDMA)), third-generation (3G) wireless communication protocols, such as Universal Mobile Telecommunications System (UMTS), CDMA2000, wideband CDMA (WCDMA) and time division-synchronous CDMA (TD-SCDMA), 3.9 generation (3.9G) wireless communication protocols, such as Evolved Universal Terrestrial Radio Access Network (E-UTRAN), with fourth-generation (4G) wireless communication protocols, international mobile telecommunications advanced (IMT-Advanced) protocols, Long Term Evolution (LTE) protocols including LTE-advanced, or the like. Further, communications interface 215 may be configured to provide for communications in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), wireless local area network (WLAN) protocols, world interoperability for microwave access (WiMAX) techniques such as IEEE 802.16, and/or wireless Personal Area Network (WPAN) techniques such as IEEE 802.15, BlueTooth (BT), low power versions of BT, ultra wideband (UWB), Wibree, Zigbee and/or the like. The communications interface 215 may also be configured to support communications at the network layer, possibly via Internet Protocol (IP).

The user interface 215 may be in communication with the processor 205 to receive user input via the user interface 215 and/or to present output to a user as, for example, audible, visual, mechanical or other output indications. The user interface 215 may include, for example, a keyboard, a mouse, a joystick, a display (e.g., a touch screen display), a microphone, a speaker, or other input/output mechanisms. According to various example embodiments, the user interface 215 may include hardware and/or software to support the operation of an image capturing device, such as a camera module. The image capturing device may be configured to capture images that may be acted upon in accordance with example embodiments of the present invention.

The measurement capturer 230, the measurement analyzer 232, and the measurement report generator 234 of example apparatus 200 may be any means or device embodied, partially or wholly, in hardware, a computer program product, or a combination of hardware and a computer program product, such as processor 205 implementing stored instructions to configure the example apparatus 200, or a hardware configured processor 205, that is configured to carry out the functions of the measurement capturer 230, the measurement analyzer 232, and/or the measurement report generator 234 as described herein. In an example embodiment, the processor 205 includes, or controls, the measurement capturer 230, the measurement analyzer 232, and/or the measurement report generator 234. The measurement capturer 230, the measurement analyzer 232, and/or the measurement report generator 234 may be, partially or wholly, embodied as processors similar to, but separate from processor 205. In this regard, the measurement capturer 230, the measurement analyzer 232, and/or the measurement report generator 234 may be in communication with the processor 205. In various example embodiments, the measurement capturer 230, the measurement analyzer 232, and/or the measurement report generator 234 may, partially or wholly, reside on differing apparatuses such that some or all of the functionality of the measurement capturer 230, the measurement analyzer 232, and/or the measurement report generator 234 may be performed by a first apparatus, and the remainder of the functionality of the measurement capturer 230, the measurement analyzer 232, and/or the measurement report generator 234 may be performed by one or more other apparatuses.

The apparatus 200 and the processor 205 may be configured to perform the following functionality via the measurement capturer 230. In this regard, the measurement capturer 235 may be configured to provide for the capturing of secondary intra-frequency measurements for a secondary carrier frequency. In this regard, the measurement capturer 230 may direct, for example, the communications interface 220 to receive signals to facilitate the capturing of intra-frequency measurements. In some example embodiments, the measurement capturer 230 may direct the capturing of secondary carrier intra-frequency measurements based on measurement parameters derived or inherited for anchor carrier parameters. Further, the measurement capturer 230 may be configured to direct the capturing of measurements in response to an indication to activate measurement capturing, and discontinue measurement capturing in response to an indication to deactivate measurement capturing.

The apparatus 200 and the processor 205 may be configured to perform the following additional functionality via the measurement analyzer 232. In this regard, the measurement analyzer 232 may be configured to determine that a secondary carrier measurement satisfies secondary carrier event criteria. In this regard, the secondary carrier event criteria may be derived or inherited from anchor carrier measurement parameters.

The apparatus 200 and the processor 205 may be configured to perform the following additional functionality via the measurement report generator 234. In this regard, the measurement report generator 234 may be configured to generate a measurement report in response to the captured secondary carrier intra-frequency measurement satisfying second carrier event criteria. The measurement report generator 234 may be configured to include a variety of information within the measurement report. Further, the measurement report generator 234 may be configured to direct the communications interface 220 to transmit the measurement report to a network entity for consideration with respect to a secondary E-DCH active set.

Referring now to FIG. 3, a more specific example apparatus in accordance with various embodiments of the present invention is provided. The example apparatus of FIG. 3 is a mobile terminal 10 configured to communicate within a wireless network, such as a cellular communications network. The mobile terminal 10 may be configured to perform the functionality of UE 101 and/or apparatus 200 as described herein. More specifically, the mobile terminal 10 may be caused to perform the functionality of measurement capturer 230, the measurement analyzer 232, and the measurement report generator 234, via the controller 20. In this regard, controller 20 may be an integrated circuit or chip configured similar to the processor 205 together with the I/O interface 206. Further, volatile memory 40 and non-volatile memory 42 may configured to support the operation of the controller 20 as computer readable storage media.

The mobile terminal 10 may further include an antenna 12, a transmitter 14, and a receiver 16, which may be included as parts of a communications interface of the mobile terminal 10. The speaker 24, the microphone 26, the display 28, and the keypad 30 may be included as parts of a user interface.

Referring now to FIG. 4, the apparatus 300 may, be embodied as, or included as a component of, a communications device with wired or wireless communications capabilities. In some example embodiments, the apparatus 300 may include or be included within communications device, such as a stationary or mobile access point, a server, a computer, or a mobile terminal such as a mobile telephone, a portable digital assistant (PDA), a pager, a mobile television, a gaming device, a mobile computer, a laptop computer, a camera, a video recorder, an audio/video player, a radio, and/or a global positioning system (GPS) device, any combination of the aforementioned, or the like. Regardless of the type of communications device, apparatus 300 may also include computing capabilities.

The example apparatus 300 includes or is otherwise in communication with a processor 305, a memory device 310, a communications interface 320, and an active set manager 335. The processor 305 may be embodied as various means implementing various functionality of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, processor 305 may be representative of a plurality of processors, or one or more multiple core processors, operating in concert. Further, the processor 305 may be comprised of a plurality of transistors, logic gates, a clock (e.g., oscillator), and the like to facilitate performance of the functionality described herein. The processor 305 may, but need not, include one or more accompanying digital signal processors. In some example embodiments, the processor 305 is configured to execute instructions stored in the memory device 310 or instructions otherwise accessible to the processor 305. The processor 305 may be configured to operate such that the processor causes the apparatus 300 to perform various functionalities described herein. Whether configured as hardware or via instructions stored on a computer-readable storage medium, or by a combination thereof, the processor 305 may be an entity capable of performing operations according to embodiments of the present invention while configured accordingly. Thus, in example embodiments where the processor 305 is embodied as an ASIC, FPGA, or the like, the processor 305 is specifically configured hardware for conducting the operations described herein. Alternatively, in example embodiments where the processor 305 is embodied as an executor of instructions stored on a computer-readable storage medium, the instructions specifically configure the processor 305 to perform the algorithms and operations described herein. In some example embodiments, the processor 305 is a processor of a specific device (e.g., a mobile terminal) configured for employing example embodiments of the present invention by further configuration of the processor 305 via executed instructions for performing the algorithms and operations described herein.

The memory device 310 may be one or more tangible and/or non-transitory computer-readable storage media that may include volatile and/or non-volatile memory. In some example embodiments, the memory device 310 includes Random Access Memory (RAM) including dynamic and/or static RAM, on-chip or off-chip cache memory, and/or the like. Further, memory device 310 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 310 may include a cache area for temporary storage of data. In this regard, some or all of memory device 310 may be included within the processor 305.

Further, the memory device 310 may be configured to store information, data, applications, computer-readable program code instructions, or the like for enabling the processor 305 and the example apparatus 300 to carry out various functions in accordance with example embodiments of the present invention described herein. For example, the memory device 310 could be configured to buffer input data for processing by the processor 305. Additionally, or alternatively, the memory device 310 may be configured to store instructions for execution by the processor 305.

The I/O interface 306 may be any device, circuitry, or means embodied in hardware, computer program product, or a combination of hardware and software that is configured to interface the processor 305 with other circuitry or devices, such as the communications interface 320. In some example embodiments, the processor 305 may interface with the memory 310 via the I/O interface 306. The I/O interface 306 may be configured to convert signals and data into a form that may be interpreted by the processor 305. The I/O interface 306 may also perform buffering of inputs and outputs to support the operation of the processor 205. According to some example embodiments, the processor 305 and the I/O interface 306 may be combined onto a single chip or integrated circuit configured to perform, or cause the apparatus 300 to perform, various functionalities of the present invention.

The communication interface 320 may be any device or means embodied in either hardware, a computer program product, or a combination of hardware and a computer program product that is configured to receive and/or transmit data from/to any other device or module in communication with the example apparatus 300 via an air interface or communications connection 325. Processor 305 may also be configured to facilitate communications via the communications interface by, for example, controlling hardware included within the communications interface 320. In this regard, the communication interface 315 may include, for example, one or more antennas, a transmitter, a receiver, a transceiver and/or supporting hardware, including a processor for enabling communications. Via the communication interface 320, the example apparatus 300 may communicate with various other network entities in a device-to-device fashion and/or via indirect communications via a base station, access point, server, gateway, router, or the like.

The communications interface 320 may be configured to provide for communications in accordance with any wired or wireless communication standard. The communications interface 320 may be configured to support communications in multiple antenna environments, such as multiple input multiple output (MIMO) environments. Further, the communications interface 320 may be configured to support orthogonal frequency division multiplexed (OFDM) signaling. In some example embodiments, the communications interface 315 may be configured to communicate in accordance with various techniques, such as, second-generation (2G) wireless communication protocols IS-136 (time division multiple access (TDMA)), GSM (global system for mobile communication), IS-95 (code division multiple access (CDMA)), third-generation (3G) wireless communication protocols, such as Universal Mobile Telecommunications System (UMTS), CDMA2000, wideband CDMA (WCDMA) and time division-synchronous CDMA (TD-SCDMA), 3.9 generation (3.9G) wireless communication protocols, such as Evolved Universal Terrestrial Radio Access Network (E-UTRAN), with fourth-generation (4G) wireless communication protocols, international mobile telecommunications advanced (IMT-Advanced) protocols, Long Term Evolution (LTE) protocols including LTE-advanced, or the like. Further, communications interface 315 may be configured to provide for communications in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), wireless local area network (WLAN) protocols, world interoperability for microwave access (WiMAX) techniques such as IEEE 802.16, and/or wireless Personal Area Network (WPAN) techniques such as IEEE 802.15, BlueTooth (BT), low power versions of BT, ultra wideband (UWB), Wibree, Zigbee and/or the like. The communications interface 315 may also be configured to support communications at the network layer, possibly via Internet Protocol (IP).

The active set manager 335 of example apparatus 300 may be any means or device embodied, partially or wholly, in hardware, a computer program product, or a combination of hardware and a computer program product, such as processor 305 implementing stored instructions to configure the example apparatus 300, or a hardware configured processor 305, that is configured to carry out the functions of the active set manager 335 as described herein. In an example embodiment, the processor 305 includes, or controls, the active set manager 335. The active set manager 335 may be, partially or wholly, embodied as processors similar to, but separate from processor 305. In this regard, the active set manager 335 may be in communication with the processor 305. In various example embodiments, the active set manager 335 may, partially or wholly, reside on differing apparatuses such that some or all of the functionality of the active set manager 335 may be performed by a first apparatus, and the remainder of the functionality of the active set manager 335 may be performed by one or more other apparatuses.

The apparatus 300 and the processor 305 may be configured to perform the following functionality via the active set manager 335. In this regard, the active set manager 335 may be configured to receive a measurement report. The measurement report may include various information, including information regarding the results of secondary carrier measurements captured based on parameters derived or inherited from anchor carrier measurement parameters. In this regard, the measurement report may be received from a UE that has identified a secondary carrier event based on secondary carrier event criteria derived or inherited from anchor carrier measurement parameters. The active set manager 335 may be further configured to modify an active set, such as a secondary active set based on the content of the measurement report.

Figure 5:
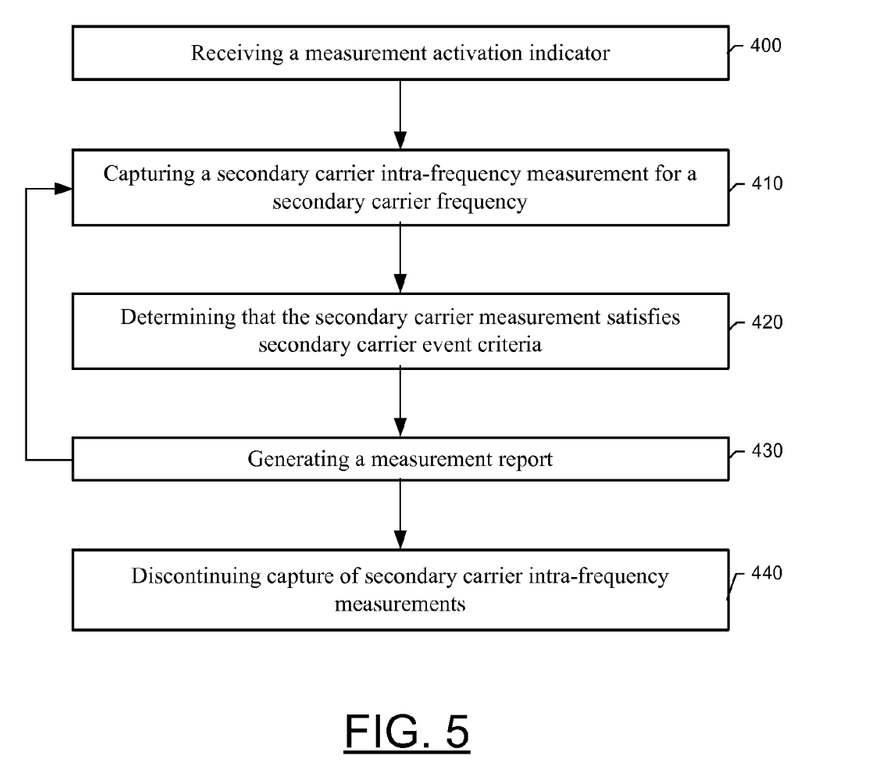
FIG. 5 illustrates an example method for managing carrier measurements from the perspective of user equipment according to various example embodiments of the present invention.
Figure 6:
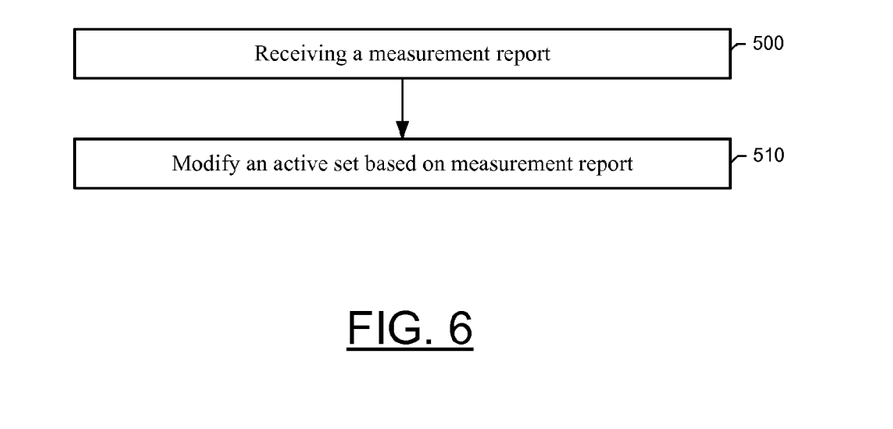
FIG. 6 illustrates another example method for managing carrier measurements according to various example embodiments of the present invention.

FIGS. 5 and 6 illustrate flowcharts of example systems, methods, and/or computer program products according to example embodiments of the invention. It will be understood that each block or operation of the flowcharts, and/or combinations of blocks or operations in the flowcharts, can be implemented by various means. Means for implementing the blocks or operations of the flowcharts, combinations of the blocks or operations in the flowchart, or other functionality of example embodiments of the present invention described herein may include hardware, and/or a computer program product including a computer-readable storage medium having one or more computer program code instructions, program instructions, or executable computer-readable program code instructions stored therein. In this regard, program code instructions may be stored on a memory device, such as memory devices 210 or 310, of an example apparatus, such as example apparatus 200 or 300, and executed by a processor, such as the processor 205 or 305. As will be appreciated, any such program code instructions may be loaded onto a computer or other programmable apparatus (e.g., processor 205, memory device 210, processor 305, memory device 310, or the like) from a computer-readable storage medium to produce a particular machine, such that the particular machine becomes a means for implementing the functions specified in the flowcharts' block(s) or operation(s). These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' block(s) or operation(s). The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowcharts' block(s) or operation(s).

Accordingly, execution of instructions associated with the blocks or operations of the flowchart by a processor, or storage of instructions associated with the blocks or operations of the flowcharts in a computer-readable storage medium, support combinations of operations for performing the specified functions. It will also be understood that one or more blocks or operations of the flowcharts, and combinations of blocks or operations in the flowcharts, may be implemented by special purpose hardware-based computer systems and/or processors which perform the specified functions, or combinations of special purpose hardware and program code instructions.

FIG. 5 depicts one or more flowcharts of example methods for managing carrier measurements from the perspective of an apparatus operating as a UE. The example method includes receiving a measurement activation indicator at 400. In this regard, the activation indicator may be received from a network entity (e.g., the RNC 100). Possibly in response to receipt of the activation indicator, a secondary carrier intra-frequency measurement may be captured for a secondary carrier frequency at 410. The secondary carrier intra-frequency measurement may be captured based on measurement parameters derived or inherited from anchor carrier parameters. Further, the example method may include determining that the secondary carrier measurement satisfies secondary carrier event criteria. In this regard, the secondary carrier event criteria may be secondary carrier measurement parameters that may be derived or inherited from an anchor carrier measurement parameter. At 430, the example method may further include generating a measurement report. According to various example embodiments, the measurement report may be generated in response to, depending on the associated secondary carrier measurement parameters, capturing a measurement or determining that an event has occurred. The measurement report may be sent to a network entity for consideration with respect to a secondary active set. According to some example embodiments, the method may repeat the operations of capturing at 410, determining at 420, and generating at 430. The example method may further include discontinuing capture of secondary carrier intra-frequency measurements at 440, for example, in response to receiving a measurement deactivation indicator.

FIG. 6 depicts one or more flowcharts of example methods for managing carrier measurements from the perspective of a network entity, such as the RNC 100. The example method may include, receiving a measurement report at 500, the report having been generated based on secondary carrier intra-frequency measurements captured based on parameters derived from anchor carrier measurement parameters. The example method may also include modifying an active set (e.g., a secondary active set) based on the measurement report at 510.

Additional example embodiments may include the following. One example embodiment is a method for managing carrier measurements. The example method includes providing for capturing a secondary carrier intra-frequency measurement for a secondary carrier frequency, and generating a measurement report for reporting the results of the measurement to a network entity. Parameters for the secondary carrier intra-frequency measurement may be derived from one or more parameters for an anchor frequency. Further, in some example embodiments, the example method may include determining that the secondary carrier measurement satisfies secondary carrier event criteria. In some example embodiments, capturing a secondary carrier intra-frequency measurement may be performed in response to receiving a measurement activation indicator. In some example embodiments, capturing a secondary carrier intra-frequency measurement may be discontinued in response to a measurement deactivation indicator. The secondary carrier event criteria may be one or more secondary carrier measurement parameters derived from an anchor carrier measurement parameter. The example method also includes generating a measurement report, based on the measurement parameters, in response to capturing a secondary carrier intra-frequency measurement or the captured secondary carrier intra-frequency measurement satisfying the secondary carrier event criteria. The measurement report message may include a measurement identifier, an event identifier associated with the satisfied event criteria, or other results of the measurement.

In another example method of the present invention, the example method may include receiving a measurement report. The measurement report may include measurement results including, for example, a measurement identifier and/or an event identifier. The event identifier may be included in the measurement report in response to the event criteria for a secondary carrier being satisfied. The secondary carrier measurement parameters used in capturing the secondary carrier intra-frequency measurements may be derived from anchor carrier measurement parameters. The example method also includes modifying an active set based on the measurement report.

Another example embodiment is an example apparatus for managing carrier measurements. The example apparatus comprises at least one processor and at least one memory including computer program code. The at least one memory and the computer program code may be configured to, with the at least one processor, cause the example apparatus to perform various functionality. For example, the example apparatus may be caused to perform providing for capturing a secondary carrier intra-frequency measurement for a secondary carrier frequency, and generating a measurement report for reporting the results of the measurement to a network entity. Parameters for the secondary carrier intra-frequency measurement may be derived from one or more parameters for an anchor frequency. Further, in some example embodiments, the example method may include determining that the secondary carrier measurement satisfies secondary carrier event criteria. In some example embodiments, capturing a secondary carrier intra-frequency measurement may be performed in response to receiving a measurement activation indicator. In some example embodiments, capturing a secondary carrier intra-frequency measurement may be discontinued in response to a measurement deactivation indicator. The secondary carrier event criteria may be one or more secondary carrier measurement parameters derived from an anchor carrier measurement parameter. The example apparatus is also caused to perform generating a measurement report, based on the measurement parameters, in response to capturing a secondary carrier intra-frequency measurement or the captured secondary carrier intra-frequency measurement satisfying the secondary carrier event criteria. The measurement report message may include a measurement identifier, an event identifier associated with the satisfied event criteria, or other results of the measurement.

Another example embodiment is an example apparatus for managing carrier measurements. The example apparatus comprises at least one processor and at least one memory including computer program code. The at least one memory and the computer program code may be configured to, with the at least one processor, cause the example apparatus to perform various functionality. For example, the example apparatus may be caused to perform receiving a measurement report. The measurement report may include measurement results including, for example, a measurement identifier and/or an event identifier. The event identifier may be included in the measurement report in response to the event criteria for a secondary carrier being satisfied. The secondary carrier measurement parameters used in capturing the secondary carrier intra-frequency measurements may be derived from anchor carrier measurement parameters. The example apparatus is also caused to perform modifying an active set based on the measurement report.

Another example embodiment is an example computer program product for managing carrier measurements. The example computer program product comprises at least one computer-readable storage medium having executable computer-readable program code instructions stored therein. The computer-readable program code instructions of the example computer program product are for providing for capturing a secondary carrier intra-frequency measurement for a secondary carrier frequency, and generating a measurement report for reporting the results of the measurement to a network entity. Parameters for the secondary carrier intra-frequency measurement may be derived from one or more parameters for an anchor frequency. Further, in some example embodiments, the example method may include determining that the secondary carrier measurement satisfies secondary carrier event criteria. In some example embodiments, capturing a secondary carrier intra-frequency measurement may be performed in response to receiving a measurement activation indicator. In some example embodiments, capturing a secondary carrier intra-frequency measurement may be discontinued in response to a measurement deactivation indicator. The secondary carrier event criteria may be one or more secondary carrier measurement parameters derived from an anchor carrier measurement parameter. The computer-readable program code instructions of the example computer program product are also for generating a measurement report, based on the measurement parameters, in response to capturing a secondary carrier intra-frequency measurement or the captured secondary carrier intra-frequency measurement satisfying the secondary carrier event criteria. The measurement report message may include a measurement identifier, an event identifier associated with the satisfied event criteria, or other results of the measurement.

Another example embodiment is an example computer program product for managing carrier measurements. The example computer program product comprises at least one computer-readable storage medium having executable computer-readable program code instructions stored therein. The computer-readable program code instructions of the example computer program product are for receiving a measurement report. The measurement report may include measurement results including, for example, a measurement identifier and/or an event identifier. The event identifier may be included in the measurement report in response to the event criteria for a secondary carrier being satisfied. The secondary carrier measurement parameters used in capturing the secondary carrier intra-frequency measurements may be derived from anchor carrier measurement parameters. The example method also includes modifying an active set based on the measurement report.

Another example embodiment is an apparatus for managing carrier measurements. The example apparatus includes means (e.g., a processor) for providing for capturing a secondary carrier intra-frequency measurement for a secondary carrier frequency, and means for generating a measurement report for reporting the results of the measurement to a network entity. Parameters for the secondary carrier intra-frequency measurement may be derived from one or more parameters for an anchor frequency. Further, in some example embodiments, the example method may include means (e.g., a processor) for determining that the secondary carrier measurement satisfies secondary carrier event criteria. In some example embodiments, capturing a secondary carrier intra-frequency measurement may be performed in response to receiving a measurement activation indicator. In some example embodiments, capturing a secondary carrier intra-frequency measurement may be discontinued in response to a measurement deactivation indicator. The secondary carrier event criteria may be one or more secondary carrier measurement parameters derived from an anchor carrier measurement parameter. The example apparatus also includes means (e.g., a processor) for generating a measurement report, based on the measurement parameters, in response to capturing a secondary carrier intra-frequency measurement or the captured secondary carrier intra-frequency measurement satisfying the secondary carrier event criteria. The measurement report message may include a measurement identifier, an event identifier associated with the satisfied event criteria, or other results of the measurement.

Another example embodiment is an apparatus for managing carrier measurements. The example apparatus includes means (e.g., a processor) for receiving a measurement report. The measurement report may include measurement results including, for example, a measurement identifier and/or an event identifier. The event identifier may be included in the measurement report in response to the event criteria for a secondary carrier being satisfied. The secondary carrier measurement parameters used in capturing the secondary carrier intra-frequency measurements may be derived from anchor carrier measurement parameters. The example apparatus also includes means for (e.g., a processor) modifying an active set based on the measurement report.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
capturing a secondary carrier intra-frequency measurement for a secondary carrier frequency, wherein parameters for capturing the secondary carrier intra-frequency measurement are derived by being inherited from the parameters for capturing an anchor carrier intra-frequency measurement for an anchor carrier frequency;
determining that the secondary carrier measurement satisfies secondary carrier event criteria by comparing the secondary carrier measurement to one or more thresholds of the secondary carrier event criteria;
generating, using a processor, a measurement report for reporting a result of the measurement to a network entity, wherein the measurement report comprises an event identifier uniquely defined to an event when the secondary carrier measurement exceed or fall below the one or more thresholds of the secondary carrier event criteria; and
discontinuing the capturing of the secondary carrier intra-frequency measurement in response to receiving at least a measurement deactivation indicator associated with the event identifier.

2. The method of claim 1, wherein capturing the secondary carrier intra-frequency measurement includes capturing the secondary carrier intra-frequency measurement in response to at least receiving a measurement activation indicator.

3. The method of claim 1, further comprising determining that the secondary carrier measurement satisfies secondary carrier event criteria, the secondary carrier event criteria being one or more secondary carrier measurement parameters derived from an anchor carrier measurement parameter.

4. The method of claim 1, wherein generating the measurement report includes generating the measurement report in response to at least the secondary carrier intra-frequency measurement satisfying secondary carrier event criteria wherein the measurement report includes a measurement identifier or the event identifier.

5. An apparatus comprising at least one processor and at least one memory including computer program code, the at least one memory and the computer program code configured to, with the at least one processor, cause the apparatus at least to:
capture a secondary carrier intra-frequency measurement for a secondary carrier frequency, wherein parameters for capturing the secondary carrier intra-frequency measurement are derived by being inherited from the parameters for capturing an anchor carrier intra-frequency measurement for an anchor carrier frequency;
determine that the secondary carrier measurement satisfies secondary carrier event criteria by comparing the secondary carrier measurement to one or more thresholds of the secondary carrier event criteria;

generate a measurement report for reporting a result of the measurement to a network entity, wherein the measurement report comprises an event identifier uniquely defined to an event when the secondary carrier measurement exceed or fall below the one or more thresholds of the secondary carrier event criteria; and discontinue capturing the secondary carrier intra-frequency measurement in response to receiving at least a measurement deactivation indicator associated with the event identifier.

6. The apparatus of claim 5, wherein the apparatus caused to capture the secondary carrier intra-frequency measurement includes being caused to capture the secondary carrier intra-frequency measurement in response to at least receiving a measurement activation indicator.

7. The apparatus of claim 5, wherein the apparatus is further caused to determine that the secondary carrier measurement satisfies secondary carrier event criteria, the secondary carrier event criteria being one or more secondary carrier measurement parameters derived from an anchor carrier measurement parameter.

8. The apparatus of claim 5, wherein the apparatus being caused to generate the measurement report includes being caused to generate the measurement report in response to at least the secondary carrier intra-frequency measurement satisfying secondary carrier event criteria wherein the measurement report includes a measurement identifier or the event identifier.

9. A computer program product comprising a non-transitory computer readable medium having computer program code stored thereon, the computer program code configured to cause an apparatus at least to:

capture a secondary carrier intra-frequency measurement for a secondary carrier frequency, wherein parameters for capturing the secondary carrier intra-frequency measurement are derived by being inherited from the parameters for capturing an anchor carrier intra-frequency measurement for an anchor carrier frequency;

determine that the secondary carrier measurement satisfies secondary carrier event criteria by comparing the secondary carrier measurement to one or more thresholds of the secondary carrier event criteria;

generate a measurement report for reporting a result of the measurement to a network entity, wherein the measurement report comprises an event identifier uniquely defined to an event when the secondary carrier measurement exceed or fall below the one or more thresholds of the secondary carrier event criteria; and discontinue capturing the secondary carrier intra-frequency measurement in response to receiving at least a measurement deactivation indicator associated with the event identifier.

10. The computer program product of claim 9, wherein the computer program code configured to cause the apparatus to capture the secondary carrier intra-frequency measurement includes being configured to cause the apparatus to capture the secondary carrier intra-frequency measurement in response to at least receiving a measurement activation indicator.

11. The computer program product of claim 9, wherein the computer program code is further configured to cause the apparatus to determine that the secondary carrier measurement satisfies secondary carrier event criteria, the secondary carrier event criteria being one or more secondary carrier measurement parameters derived from an anchor carrier measurement parameter.

12. The computer program product of claim 9, wherein the computer program code configured to cause the apparatus to generate the measurement report includes being configured to cause the apparatus to generate the measurement report in response to at least the secondary carrier intra-frequency measurement satisfying secondary carrier event criteria.

* * * * *